United States Patent [19]
Imada et al.

[11] Patent Number: 5,982,057
[45] Date of Patent: Nov. 9, 1999

[54] MOLDED MOTOR

[75] Inventors: Kensuke Imada, Hyogo; Kenji Nakao; Takeshi Sugiyama, both of Tokyo, all of Japan

[73] Assignee: Mitsubishi Denki Kabushiki Kaisha, Tokyo, Japan

[21] Appl. No.: 09/199,192

[22] Filed: Nov. 25, 1998

[30] Foreign Application Priority Data

Jun. 1, 1998 [JP] Japan .................................. 10-151564

[51] Int. Cl.[6] ................................................. H02K 1/04
[52] U.S. Cl. .................................. 310/43; 310/45; 310/89; 310/91
[58] Field of Search ................................. 310/43, 45, 89, 310/90, 91

[56] References Cited

U.S. PATENT DOCUMENTS

| | | | |
|---|---|---|---|
| 5,191,698 | 3/1993 | Sumi et al. ............................... | 29/596 |
| 5,705,866 | 1/1998 | Oguchi .................................... | 310/67 R |
| 5,760,512 | 6/1998 | Ohi et al. ................................. | 310/91 |
| 5,763,978 | 6/1998 | Uchida et al. ........................... | 310/215 |

FOREIGN PATENT DOCUMENTS 63-148844   6/1988   Japan .

*Primary Examiner*—Nestor Ramirez
*Assistant Examiner*—Saeed Ghahramani
*Attorney, Agent, or Firm*—Sughrue, Mion, Finn, Macpeak & Seas, PLLC

[57] ABSTRACT

The present invention provides a molded motor in which the axial center of an inserted body can easily be aligned with the axial center of the rotor of the mold motor.

The molded motor of the present invention is provided with: a stator 30 having a stator core 31 laminated from a plurality of layers of thin metal coldrolled steel plate and stator coils 8 mounted in the stator core 30; a rotor 2 rotatably disposed inside the stator 30; and a molded main body 4 made of resin which covers the stator 30 and has a receiving portion 17 in which an annulus 16 is received, wherein guide portions 34 are formed in the cold-rolled steel plate closest to the annulus 16 to align the axial center of the annulus 16 with the axial center of the rotor 2.

9 Claims, 3 Drawing Sheets

MOLDED MOTOR

BACKGROUND OF THE INVENTION

1. Field of the Invention

The present invention relates to a molded motor provided with: a stator; a rotor rotatably disposed inside the stator; and a molded main body composed of resin which covers the stator.

2. Description of the Related Art

FIG. 3 is a cross-section of a conventional molded motor, and this molded motor is provided with: a stator 1; a rotor 2 rotatably disposed inside the stator 1; bearings 3 disposed at both ends of the rotor 2 to support the rotor 2 so that it can rotate freely; and a molded main body 4 composed of resin which covers the stator 1.

The stator 1 is provided with: a stator core 6 laminated from a plurality of layers of thin cold-rolled steel plate 5, which is a magnetic plate (the stator core 6 shown in FIG. 3 is a cross-section along line A—A of the stator core 6 in FIG. 4); stator coils 8 mounted on the tooth portions 22 of the stator core 6; a first guide 9 and second guide 10 which fit into the stator core 6 from the top and bottom respectively to insulate between the stator coils 8 and the stator core 6; and a terminal 11 fixed by heat crimping to the second guide 10 and connected to the stator coils 8.

The cold-rolled steel plate 5 has a plurality of tooth portions 22 extending radially inward which are formed equidistantly around it.

The rotor 2 is provided with: a shaft 12 supported at both ends by the bearings 3 so that it can rotate freely; and magnets 13 fixed to the shaft 12 with adhesive, arranged with alternating north-seeking (N) poles and south-seeking (S) poles.

The molded main body 4 has: a connector portion 40; flange portions 15 integrated with bushes 14 into which bolts (not shown) are inserted; and a receiving portion 17 which receives an annulus 16, which is an inserted body.

The molded motor of the above construction is connected by means of bolts inserted into the bushes 14 to a throttle valve device, which regulates the amount of air delivered to an internal combustion engine.

The throttle valve device is provided with: an annulus 16 which is inserted into the receiving portion 17 of the molded main body 4 and which has an internal gear 18 on its inner wall; a sun gear 19 connected to the shaft 12; a planetary gear (not shown) which engages with the sun gear 19 and the internal gear 18; and a shaft (not shown) which passes through the center of the planetary gear.

In the molded motor of the above construction, the molded main body 4 is formed integrally with the stator 1 by insertion molding, in which resin is injected into a metal mold in which the stator 1 and a bush 20 have been placed, then the bearing 3, which is secured to the shaft 12, is inserted into the bush 20, and the stator 1 and rotor 2 are integrated.

In the molded motor of the above construction, rotating magnetic fields of north-seeking (N) poles and south-seeking (S) poles are generated in the stator core 6 by passing an electric current through the stator coils 8, and the magnets 13 and the shaft 12 secured to the magnets 13 follow this rotating magnetic field and rotate.

The sun gear 19 of the throttle valve device rotates with the rotation of the shaft 12. The planetary gear, which is engaged with the sun gear 19 and the internal gear 18 of the annulus 16, rotates and revolves around the sun gear 19. With the rotation of the planetary gear, a shaft and a gear (not shown) rotate and the throttle valve (not shown) rotates. The amount of air delivered to the internal combustion engine varies in response to the rotational angle of this throttle valve.

In the conventional molded motor, the annulus 16, which is an inserted body, is inserted into the receiving portion 17 formed in the molded main body 4, but because the molded main body 4 is formed from resin, the engaging portion 17a of the receiving portion 17 may not be formed in a true circle of the required dimensions due to variations in the thermal contraction of different portions of the molded main body 4 during natural cooling, etc., and the axial center of the shaft 12 of the mold motor and the axial center of the annulus 16 of the throttle valve device may not be aligned, and thus; it suffers from the following problems:

a) the boss portion 21 of the annulus 16 cannot be inserted into the engaging portion 17a of the molded main body 4, and so product yield is poor; and b) the gears of the throttle valve device do not engage each other smoothly, and so undesired noise is generated and the gears wear down in a short time.

SUMMARY OF THE INVENTION

The present invention is aimed at solving the above problems and an object of the present invention is to provide a molded motor in which the axial center of an inserted body can easily be aligned with the axial center of the rotor of the mold motor.

In the molded motor according to the present invention, guide portions are formed in the magnetic plate closest to the inserted body to align the axial center of the inserted body with the axial center of the rotor.

In the molded motor according to the present invention, the magnetic plate may also have a plurality of tooth portions extending radially inward which are formed equidistantly around it, and arc-shaped guide portions which are bent towards the inserted body and come into contact with the inserted body may be formed in the ends of the tooth portions.

In the molded motor according to the present invention, the inserted body may also be an annulus which is a compositional element of a throttle valve device which regulates the amount of intake air in an internal combustion engine.

In the molded motor according to the present invention, the magnetic plate may also be a cold-rolled steel plate.

In the molded motor according to the present invention, the molded main body may also be composed of polyphenylene sulfide resin.

DETAILED DESCRIPTION OF THE PREFERRED EMBODIMENTS

Embodiment 1

Figure 1:
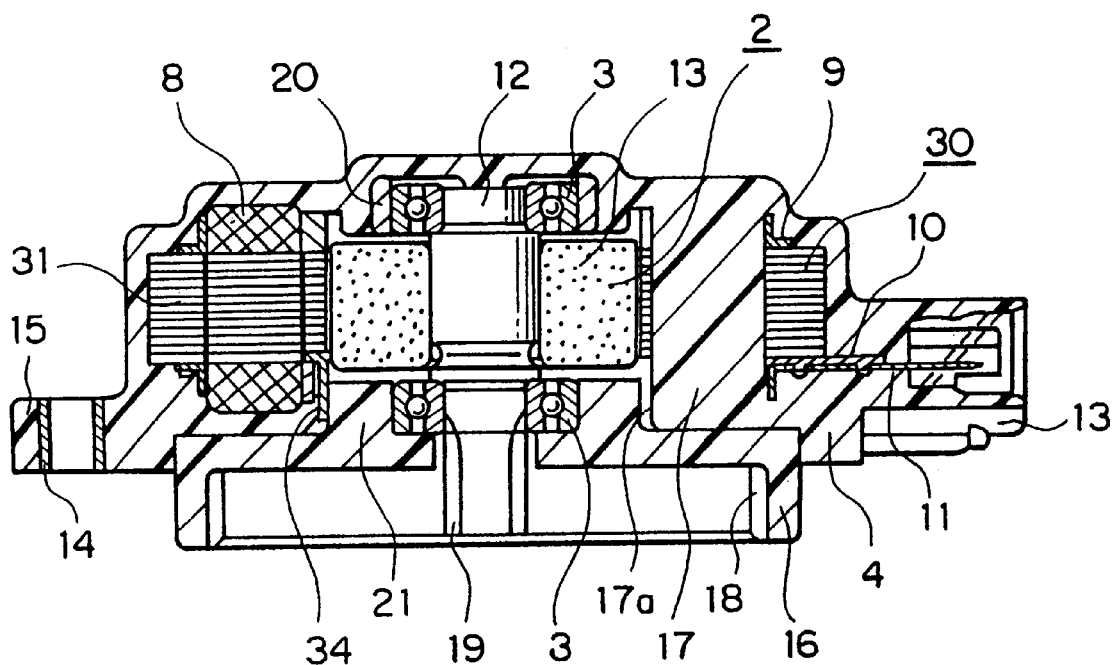
FIG. 1 is a cross-section of the molded motor according to Embodiment 1 of the present invention.

FIG. 1 is a cross-section of the molded motor according to Embodiment 1 of the present invention, and this molded motor is provided with: a stator 30; a rotor 2 rotatably disposed inside the stator 30; bearings 3 disposed at both ends of the rotor 2 to support the rotor 2 so that it can rotate freely; and a molded main body 4 composed of polyphenylene sulfide resin which covers the stator 30.

Figure 2:
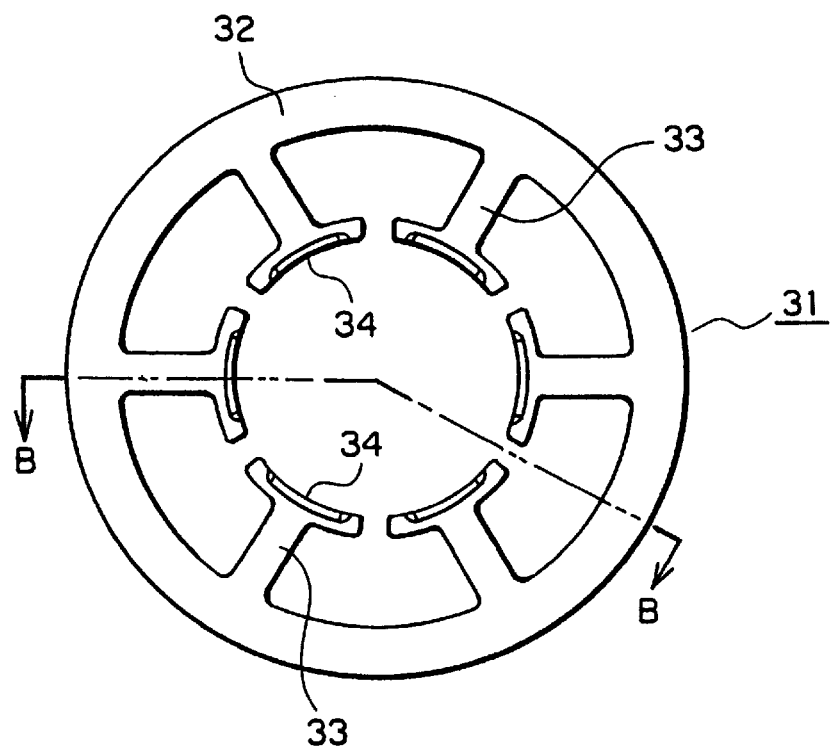
FIG. 2 is a bottom plan view of the stator core in FIG. 1.
Figure 3:
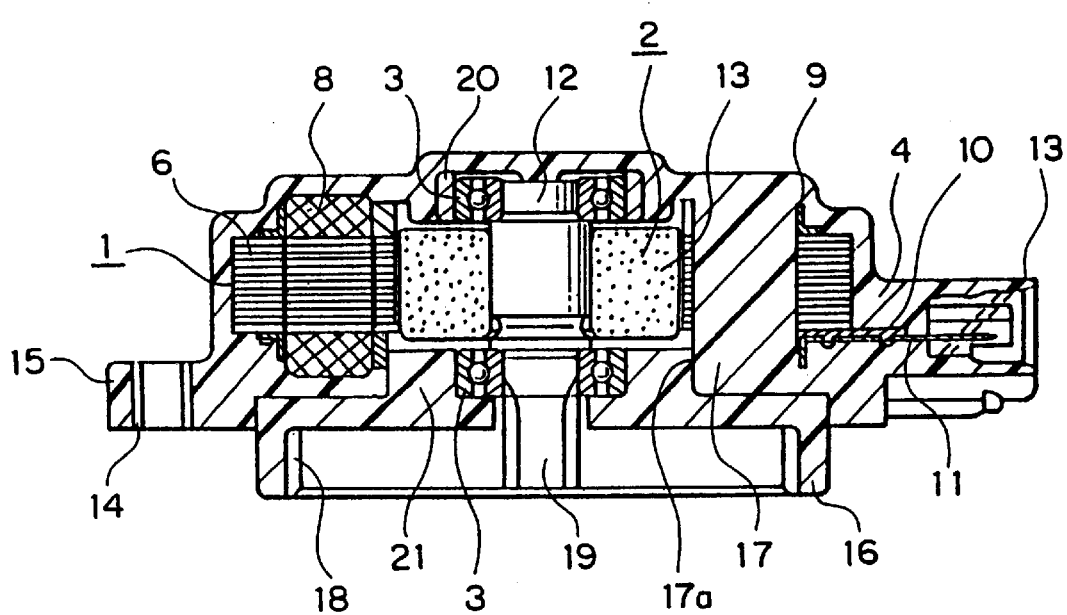
FIG. 3 is a cross-section of a conventional molded motor.
Figure 4:
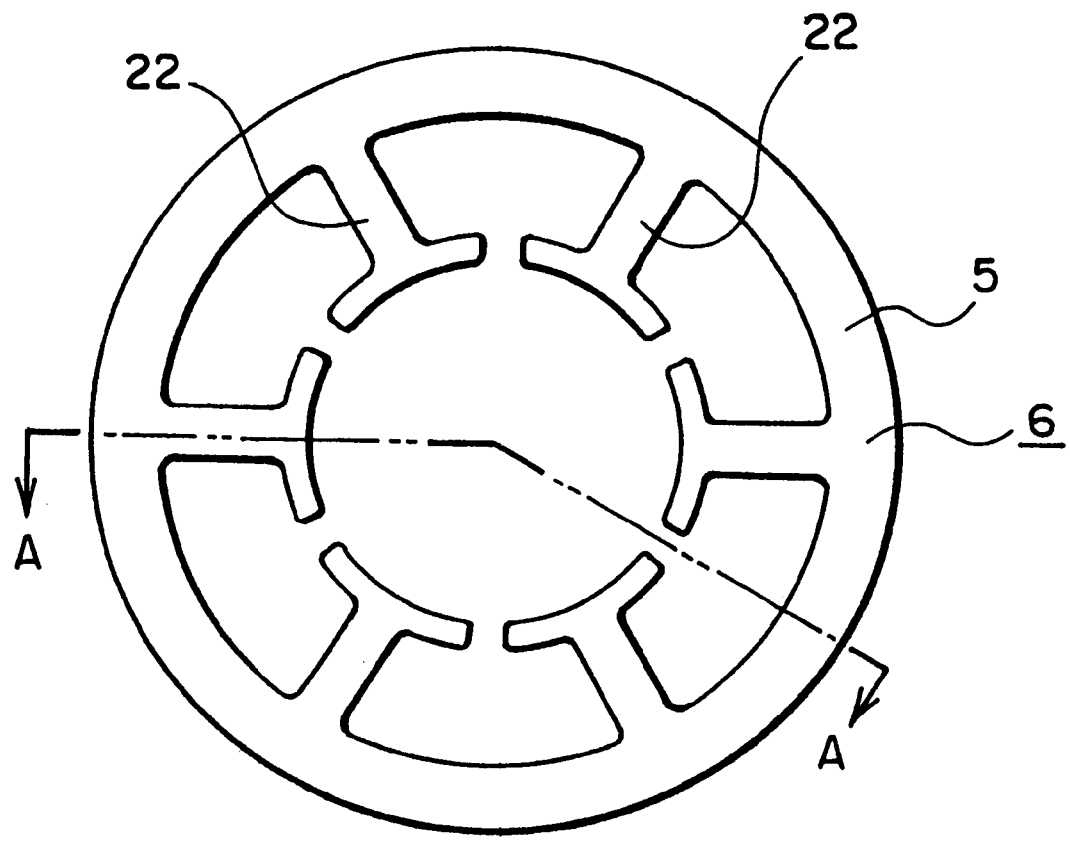
FIG. 4 is a bottom plan view of the stator core in FIG. 3.

The stator 30 is provided with: a stator core 31 laminated from a plurality of layers of thin cold-rolled steel plate 32, which is a magnetic plate (the stator core 31 shown in FIG. 1 is a cross-section along line B—B of the stator core 31 in FIG. 2); stator coils 8 mounted on the tooth portions 33 of the stator core 31; a first guide 9 and second guide 10 which fit into the stator core 31 from the top and bottom respectively to insulate between the stator coils 8 and the stator core 31; and a terminal 11 fixed by heat crimping to the second guide 10 and connected to the stator coils 8.

The cold-rolled steel plate 32 has a plurality of tooth portions 33 extending radially inward which are formed equidistantly around it. Guide portions 34 which are bent towards the annulus 16, which is an inserted body, are formed in the ends of the tooth portions 33 of the cold-rolled steel plate 32 in the lowest portion of the stator core 31. Each of the guide portions 34 is arc-shaped and presses on the outer wall of the boss portion 21 of the annulus 16 and aligns the axial center of the annulus 16 with the axial center of the rotor 2.

The rotor 2 is provided with: a shaft 12 supported at both ends by the bearings 3 so that it can rotate freely; and magnets 13 fixed to the shaft 12 with adhesive, arranged with alternating north-seeking (N) poles and south-seeking (S) poles.

The molded main body 4 has: a connector portion 40; flange portions 15 integrated with bushes 14 into which bolts (not shown) are inserted; and a receiving portion 17 which receives an annulus 16, which is an inserted body.

The molded motor of the above construction is connected by means of bolts inserted into the bushes 14 to a throttle valve device, which regulates the amount of air delivered to an internal combustion engine.

The throttle valve device is provided with: an annulus 16 which is inserted into the receiving portion 17 of the molded main body 4 and which has an internal gear 18 on its inner wall; a sun gear 19 connected to the shaft 12; a planetary gear (not shown) engaged with the sun gear 19 and the internal gear 18; and a shaft (not shown) passing through the center of the planetary gear.

In the molded motor of the above construction, the molded main body 4 is formed integrally with the stator 30 by insertion molding, in which resin is injected into a metal mold in which the stator 30 and a bush 20 have been placed, then the bearing 3, which is secured to the shaft 12, is inserted into the bush 20, and the stator 30 and rotor 2 are integrated.

In the molded motor assembled in this way, the boss portion 21 of the annulus 16 is inserted into the engaging portion 17*a* of the receiving portion 17 and the annulus 16 of the throttle valve device is integrated with the molded motor. At that time, the boss portion 21 is pushed radially inwards by the elasticity of each of the plurality of guide portions 34 and the axial center of the annulus 16 is aligned with the axial center of the shaft 12.

In the molded motor of the above construction, rotating magnetic fields of north-seeking (N) poles and south-seeking (S) poles are generated in the stator core 31 by passing an electric current through the stator coils 8, and the magnets 13 and the shaft 12 secured to the magnets 13 follow this rotating magnetic field and rotate.

The sun gear 19 of the throttle valve device rotates with the rotation of the shaft 12. The planetary gear, which is engaged with the sun gear 19 and the internal gear 18 of the annulus 16, rotates and revolves around the sun gear 19. With the rotation of the planetary gear, a shaft and a gear (not shown) rotate and the throttle valve (not shown) rotates. The amount of air delivered to the internal combustion engine varies in response to the rotational angle of this throttle valve.

As explained above, the molded motor according to the present invention comprises the guide portions formed in the magnetic plate closest to the inserted body to align the axial center of the inserted body with the axial center of the rotor. Therefore, the molded motor enables the axial center of an inserted body to be easily aligned with the axial center of the rotor of the mold motor by means of guide portions, and product yield is improved.

The molded motor according to the present invention comprises the magnetic plate also having a plurality of tooth portions extending radially inward which are formed equidistantly around it, and arc-shaped guide portions which are bent towards the inserted body and come into contact with the inserted body. Therefore, the molded motor also enables the guide portions to be formed by a simple process.

The molded motor according to the present invention comprises the inserted body also being an annulus which is a compositional element of a throttle valve device which regulates the amount of intake air in an internal combustion engine. Therefore, the molded motor enables the axial center of an annulus to be easily aligned with the axial center of a rotor, so that the gears engage each other smoothly, generation of undesired noise is prevented, and the amount of wear on the gears is reduced.

The molded motor according to the present invention comprises the magnetic plate also being a cold-rolled steel plate. Therefore, the molded motor enables guide portions of prescribed shape and dimension to be obtained simply by pressing.

The molded motor according to the present invention comprises the molded body also being composed of polyphenylene sulfide resin. Therefore the molded motor enables a mold motor of superior heat resistance and mold ability to be obtained inexpensively.

What is claimed is:

1. A molded motor comprising: a stator having a stator core laminated from a plurality of layers of thin metal magnetic plate and stator coils mounted in said stator core; a rotor rotatably disposed inside said stator; and a molded main body made of resin which covers said stator and has a receiving portion in which an inserted body is received, wherein guide portions are formed in said magnetic plate closest to said inserted body to align the axial center of said inserted body with the axial center of said rotor.

2. The molded motor according to claim 1 wherein said inserted body is an annulus which is a compositional element of a throttle valve device which regulates the amount of intake air in an internal combustion engine.

3. The molded motor according to claim 1 wherein said magnetic plate is a cold-rolled steel plate.

4. The molded motor according to claim 1 wherein said molded main body is composed of polyphenylene sulfide resin.

5. A molded motor comprising:
- a stator having a stator core laminated from a plurality of layers of thin metal magnetic plate and stator coils mounted in said stator core;
- a rotor rotatable disposed inside said stator; and
- a molded main body made of resin which covers said stator and has a receiving portion in which an inserted body is received,
- wherein guide portions are formed in said magnetic plate closest to said inserted body to align the axial center of said inserted body with the axial center of said rotor, and
- wherein said magnetic plate has a plurality of tooth portions extending radially inward which are formed equidistantly around it, and arc-shaped guide portions which are bent towards said inserted body and come into contact with said inserted body are formed in the ends of said tooth portions.

6. The molded motor according to claim 2 wherein said inserted body is an annulus which is a compositional element of a throttle valve device which regulates the amount of intake air in an internal combustion engine.

7. The molded motor according to claim 2 wherein said magnetic plate is a coldrolled steel plate.

8. The molded motor according to claim 2 wherein said molded main body is composed of polyphenylene sulfide resin.

9. A molded motor comprising:
- a stator having a stator core laminated from a plurality of layers of thin metal magnetic plate and stator coils mounted in said stator core;
- a rotor rotatably disposed inside said stator; and
- a molded main body made of resin which covers said stator and has a receiving portion in which an inserted body is received,
- wherein guide portions are formed in said magnetic plate closest to said inserted body, and
- wherein said guide portions elastically abut against a portion of said inserted body to align the axial center of said inserted. body with the axial center of said rotor.

* * * * *